H. HUEBER.
POWER OPERATED WINDSHIELD CLEANER.
APPLICATION FILED AUG. 16, 1920.
1,437,521.
Patented Dec. 5, 1922.
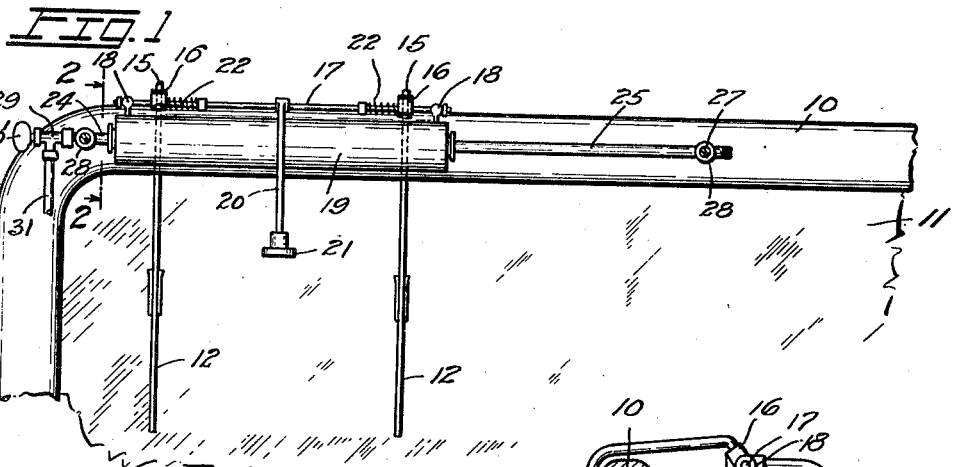
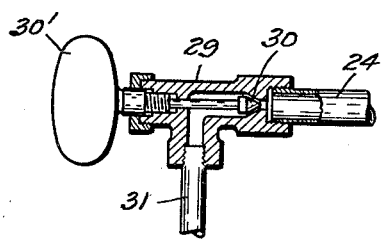
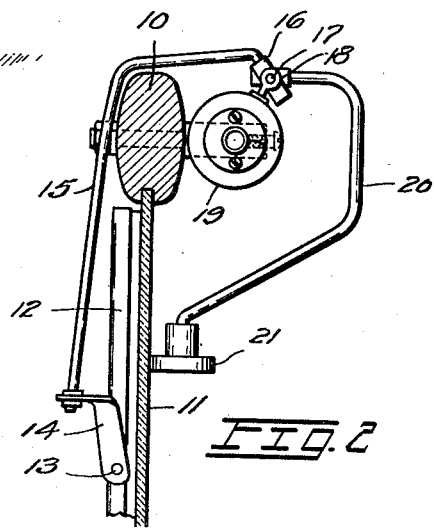
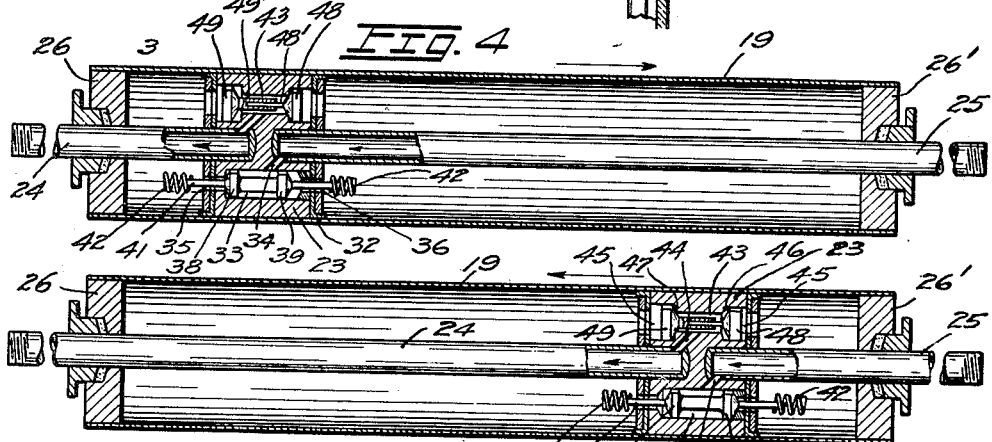
Inventor:
Henry Hueber
By his Attorney
Pierre Barnes Patented Dec. 5, 1922.

1,437,521

UNITED STATES PATENT OFFICE.

HENRY HUEBER, OF SEATTLE, WASHINGTON, ASSIGNOR, BY MESNE ASSIGNMENTS, TO POLK-HUEBER COMPANY, OF SEATTLE, WASHINGTON, A CORPORATION OF WASHINGTON.

POWER-OPERATED WINDSHIELD CLEANER. REISSUED

Application filed August 16, 1920. Serial No. 403,790.

*To all whom it may concern:*

Be it known that I, HENRY HUEBER, a citizen of the United States, residing at Seattle, in the county of King and State of Washington, have invented certain new and useful Improvements in Power-Operated Windshield Cleaners, of which the following is a specification.

This invention relates to window cleaning devices and more particularly to that type of devices which are adapted to be operated by power actuated means to remove dirt, snow or moisture from the outside of a window or windshield of a car, automobile, and the like.

The object of my invention is the provision of a simple, inexpensively constructed and efficient window cleaning device of this character which is automatic in action.

With these ends in view the invention consists in the novel construction, arrangement and combination of parts as will be hereinafter described and claimed.

In the accompanying drawings, Figure 1 is a rear elevational view of a portion of an automobile windshield showing an embodiment of my invention applied thereto. Fig. 2 is a sectional view through 2—2 of Fig. 1. Fig. 3 is a longitudinal view of the valve for regulating the supply of the power medium to the operating motor. Figs. 4 and 5 are longitudinal sectional views of the motor to an enlarged scale and illustrating the members thereof in different relative positions.

In said drawings, the reference numeral 10 represents the frame and 11 the glass of a windshield, which may be of any suitable construction.

The cleaner comprises one or more squeegee elements 12, two being shown, which are each connected by a pivotal pin, as 13 in Fig. 2, to an attachment 14 secured to an arm 15 which, in the illustrated embodiment of the invention, extends over the windshield frame 10 into a socket piece 16.

The socket pieces 16 are mounted for oscillatory movements upon a transversely arranged horizontal rod 17 which is rotatable in apertured post elements or bearings 18 secured to the ends of a cylinder 19.

Another arm 20 rigidly secured to the rod 17 extends, as shown, downwardly from the latter and carries upon its lower end a wheel 21 which tracks against the inner surface of the windshield glass 11. Coil springs 22 about said rod engage over the arms 15 and cooperate with the resiliency of the arms to cause the squeegees to press against the front surface of the glass. The aforesaid cylinder 19 constitutes the movable member of a pneumatic motor and is mounted for axial reciprocating motion upon a non-movable member.

Said non-movable member comprises a piston 23 fitted within the cylinder bore and rigidly secured to axially aligned tubular piston or guide rods 24 and 25, hereinafter respectively designated as "exhaust" and "pressure" pipes, which extend through stuffing boxes provided in the cylinder heads 26 and 26¹ and are secured, as by set screws 27, to brackets 28 rigidly connected to the frame 10.

The outer ends of said pipes are screw threaded whereby either of them may be engaged selectively in the body or casing 29 of a needle valve 30 (Fig. 3) which is manually controlled by a handle end 30¹ to regulate the supply or delivery of the power medium to or from the cylinder ends with respect to a tube 31 as will be presently explained.

The piston 23 above referred to is desirably provided with rings or, as shown, with cap leather packing 32 to make a non-leakable fit in the bore of cylinder 19.

Said piston is provided with a longitudinally disposed cylindrical chamber 33 communicating by a duct 34 with the pressure pipe 25 and through ports 35 and 36 with the spaces in the opposite ends of the cylinder.

At the ends of the chamber 33 are provided seats for a duplex valve, having two spaced heads 38 and 39, or valves proper, which are integrally connected by a bar element of less diameter than the heads. Said valve heads, moreover, are of equal diameter so that the pressure of a fluid admitted from pressure pipe 25 into chamber 33 between the heads will not disturb the valve.

From each end of said valve is a stem 41 which extends through the adjacent port and is equipped at its outer end with a buffer spring 42 which is adapted to be encountered by the heads 26 or 26¹ of the cylinder in the reciprocatory movements of the same, resulting in the duplex valve being shifted from one of the seats therefor to the other. Also provided in a piston 23 is a longitudinal passage 43 communicating by a duct 44 with the exhaust pipe 24 and with recesses 45 in opposite ends of the piston. Valve seats 46 and 47 (Fig. 5) are provided at the ends of passage 43 for valves 48 and 49 located in the recesses and adapted to close against the respective seats. The valve 48 has a stem indicated in Fig. 4 by 48¹ which slidably extends into a socket provided in a stem 49¹ of the valve 49.

The lengths of the stem 48 and socket therefor are such that, when the former is sheathed to its maximum extent in the socket, the valves will be spaced apart so as to obviate both valves being simultaneously upon their respective seats.

In operation of the invention on the windshield of an automobile which is driven by an internal combustion engine, the tube 31 is connected with the intake manifold, not shown, in which a partial vacuum obtains during the running of the engine.

Such vacuum acts alternately at opposite sides of the piston 23 and cooperates with pressure from air admitted to the opposite sides of the piston through pipe 25 from the external atmosphere and, subject to the action of the valves in the piston, serves to effect the reciprocation of the cylinder 19 and the cleaning devices 12 which are connected thereto.

Assuming the valves 38—39 and 48—49 occupy the positions relative to their seats in which they are represented in Fig. 4, then air at atmospheric pressure is admitted through pipe 25 and port 36 into the right hand space of the cylinder and at the same time air is exhausted from the left hand space through opening 45 and pipe 24 thereby effecting the movement of cylinder 19 toward the right. Such travel of the cylinder continues until the buffer spring 42 at the left hand side of the piston is engaged by the adjacent head 26 of the cylinder thereby shifting the valve 38—39 from the positions in which it is illustrated in Fig. 4 into its Fig. 5 position to accordingly supply air into the left hand cylinder-space, whereupon the air pressure acts against valve 49 to coincidently close the same against its seat and opening the other valve 48 as shown in Fig. 5. The power due to vacuum and air pressure respectively at opposite sides of the piston then serves to move the cylinder toward the left until the cylinder head 26¹ encounters the adjacent of the buffer springs 42 with a consequent shifting of the valves into their Fig. 4 positions which effects a reversal in the travel of the cylinder and the associated cleaning devices. The buffer springs 42 afford movement to the cylinder subsequent to the shifting of the valve 38—39 which controls the air inlet to enable the valves 48 and 49 to be shifted before the end of each of the cylinder strokes. By adjusting the valve 24 the operator may regulate the speed of the cylinder, or stop it by controlling the exhaust. In other applications as in railway cars where compressed air is available the valve body 29 may be employed upon the outer end of the supply pipe 25 and the tube 31 connected with the source or reservoir of compressed air and the exhaust pipe 24 would then be open at its outer end to the atmosphere.

Various of the details of construction may be varied without departing from the spirit of the invention, and I therefore do not desire to be limited as to these or in any other details, except as set forth in the claims.

What I claim is:—

1. In an apparatus for cleaning windshields, a stationary support, means to secure said support to the inner side of the top rail of a windshield frame, a member mounted to reciprocate upon said support, a rod rotatably carried by said reciprocating member and extending parallel with the axis of reciprocation thereof, an arm pivoted on said rod and extending forwardly over the top rail of the windshield frame and then downwardly in front of the glass of said windshield, a cleaning element fixed to the lower end of said arm in position to engage the outer face of said windshield glass, a second arm fixed to said rod and extending downwardly adjacent the opposite face of said glass, an anti-friction member upon the lower end of the last named arm engaging the last named face of the windshield glass, and a coil spring engaging the rod and the first named arm for yieldingly urging the cleaning element and the anti-friction member into engagement with the respective faces of the windshield glass.

2. In a window cleaning device, a support, means to detachably secure the ends of the support to the frame of a window with the support extending parallel to one bar of the window frame, a member reciprocable upon said support and having bearings fixed upon the ends thereof, a rod parallel with said reciprocable member having this rotatably mounted in the bearings, an arm pivotally mounted adjacent each bearing upon said rod for swinging transversely of the reciprocable member, said arms extending forwardly and downwardly and having cleaning elements upon their lower ends, a third arm fixed to the central portion of the rod and having an anti-friction member upon its lower end, and springs associated with said rod and with each of the first named arms for urging the arms toward each other whereby clamping engagement of the anti-friction member and cleaning elements with the window glass is had.

3. In a window cleaning device, a support, means to secure the ends of the support to the frame of a window with the support extending parallel to one bar of the window frame, a relatively long cylinder reciprocable upon said support, an arm pivotally mounted adjacent each end of the cylinder for swinging transversely of the cylinder, said arms extending forwardly and downwardly and having cleaning elements upon their lower ends, a third arm mounted substantially midway between the first named arms and having an anti-friction member upon its lower end, and spring means associated with said arms for urging the arms toward each other whereby clamping engagement of the anti-friction member and the cleaning elements with the window glass is had.

4. In a window cleaning device, a support, means to secure the ends of the support to the frame of a window with the support extending parallel to one bar of the window frame, a cylinder reciprocable upon said support, an arm pivotally mounted on the cylinder for swinging transversely of the cylinder, said arm extending downwardly at the outer side of the window pane and having a cleaning element upon its lower end, a second arm mounted on the cylinder and having an anti-friction member upon its lower end, and spring means associated with said arms for urging the arms toward each other whereby clamping engagement of the anti-friction member and the cleaning element with the window glass is had.

5. In a window cleaning device, a stationary support including a piston with opposite axially arranged guide rods, means to secure the support to the frame of a window with the support extending parallel to one bar of the window frame, a cylinder mounted for reciprocation on said guide rods, an arm carried by and fixed at an angle to the longitudinal axis of said cylinder, said arm being shaped to extend downwardly at the outer side of the window pane, and a pane cleaning element upon the lower end of said arm yieldingly urged rearwardly toward the same.

Signed at Seattle, Washington, this 31st day of July 1920.

HENRY HUEBER.

Witnesses:
PIERRE BARNES,
MARGARET G. SUPPLE.